United States Patent
Ignatyev et al.

(10) Patent No.: US 9,959,199 B2
(45) Date of Patent: May 1, 2018

(54) DIAGNOSIS OF TEST FAILURES IN SOFTWARE PROGRAMS

(71) Applicant: Oracle International Corporation, Redwood Shores, CA (US)

(72) Inventors: Igor V. Ignatyev, Saint Petersburg (RU); Alexander S. Ilin, Santa Clara, CA (US); Kirill I. Zhaldybin, Saint Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 10 days.

(21) Appl. No.: 15/184,882

(22) Filed: Jun. 16, 2016

(65) Prior Publication Data
US 2016/0371173 A1    Dec. 22, 2016

Related U.S. Application Data

(60) Provisional application No. 62/181,016, filed on Jun. 17, 2015.

(51) Int. Cl.
*G06F 11/36* (2006.01)
*G06F 9/44* (2006.01)

(52) U.S. Cl.
CPC ...... *G06F 11/3664* (2013.01); *G06F 11/3688* (2013.01); *G06F 11/3692* (2013.01)

(58) Field of Classification Search
CPC ............. G06F 11/3664; G06F 11/3688; G06F 11/3692
USPC .......................................................... 717/124
See application file for complete search history.

(56) References Cited

U.S. PATENT DOCUMENTS

| | | | |
|---|---|---|---|
| 7,076,534 B1 * | 7/2006 | Cleron | G06F 17/30867 707/E17.109 |
| 7,464,347 B2 * | 12/2008 | Ngoh | G06F 17/5045 716/100 |
| 7,614,043 B2 | 11/2009 | Ognev et al. | |
| 7,836,346 B1 | 11/2010 | Davidov et al. | |
| 8,813,039 B2 | 8/2014 | Maczuba | |
| 9,122,803 B1 | 9/2015 | Michelsen | |
| 9,135,146 B1 * | 9/2015 | Allen | G06F 11/366 |
| 9,430,359 B1 * | 8/2016 | Troutman | G06F 11/366 |
| 9,465,725 B2 | 10/2016 | Maczuba | |
| 2004/0128653 A1 * | 7/2004 | Arcand | G06F 11/3688 717/124 |

(Continued)

*Primary Examiner* — Ryan D. Coyer
(74) *Attorney, Agent, or Firm* — Park, Vaughan, Fleming & Dowler LLP (57) ABSTRACT

The disclosed embodiments provide a system that facilitates the development and testing of a software program. During operation, the system receives and stores a plurality of defect reports associated with a software program, wherein each defect report documents a previously discovered defect in the software program. In response to detecting a given test failure of the software program while testing the software program in a test environment, the system then eliminates, based on attributes of the test environment that are selected by the defect reports, one or more of the defect reports from the plurality of defect reports, wherein at least one of the selected attributes is retrieved from the test environment during the determination by invoking a provider script that is specified by one of the defect reports. Next, the system associates the test failure with a defect report that remains after the one or more eliminations.

20 Claims, 6 Drawing Sheets

(56) References Cited

U.S. PATENT DOCUMENTS

| | | | |
|---|---|---|---|
| 2006/0041864 A1* | 2/2006 | Holloway | G06F 11/3688 717/124 |
| 2007/0226546 A1* | 9/2007 | Asthana | G06F 11/3688 714/47.1 |
| 2008/0126412 A1* | 5/2008 | Ngoh | G06F 17/5045 |
| 2010/0191731 A1* | 7/2010 | Rus | G06Q 10/10 707/737 |
| 2014/0337982 A1* | 11/2014 | Crosby | H04L 63/1433 726/25 |

* cited by examiner

FIG. 6 ial Application No. 62/181,016

DIAGNOSIS OF TEST FAILURES IN SOFTWARE PROGRAMS

RELATED APPLICATION

This application claims priority under 35 U.S.C. § 119 to U.S. Provisional Application No. 62/181,016, entitled "Diagnosis of Test Failures in Software Programs," by Igor V. Ignatyev, Aleksandre Iline, and Kirill I. Zhaldybin, filed 17 Jun. 2015, the contents of which are herein incorporated by reference in their entirety.

BACKGROUND

Field

The disclosed embodiments relate to techniques for improving the development and testing of software programs. More specifically, the disclosed embodiments relate to techniques for diagnosing test failures in software programs.

Related Art

During the development of a program, software developers generally perform software testing on the software program as a part of quality assurance. Software testing is a process designed to uncover defects within the software program. Defects, which are also referred to as bugs, cause differences between the actual and expected behaviors within the program. While running one or more tests against the program during software testing, test failures can inform developers about a defect within the program, thereby enabling the developers to fix the defect.

However, in cases where the software program has multiple known defects, it may be difficult to determine which defect caused the test failure. Note that the test failure may be caused by different defects at different times. In other cases, it may be difficult to reproduce the test failure if the defect that caused the test failure arises only when specific conditions are met in the software program's operating environment. Hence, the development and testing of software programs may be facilitated by a system that assists in determining relationships between test failures and known defects in software programs.

SUMMARY

The disclosed embodiments provide a system that facilitates developing and testing a software program. During operation, the system receives and stores a plurality of defect reports associated with a software program, wherein each defect report documents a previously discovered defect in the software program. The system then tests the software program in a test environment that includes an operating system executing upon a computer, and a software development platform, wherein the software program has a plurality of attributes each associated with at least one of the operating system, the computer, and the software development platform. Next, responsive to detecting a given test failure of the software program while testing the software program, the system eliminates, based on attributes selected by the defect reports from the plurality of attributes, one or more of the defect reports from the plurality of defect reports, wherein at least one of the selected attributes is retrieved from the test environment during the determination by invoking a provider script that is specified by one of the defect reports. The system then associates the test failure with a defect report that remains after the one or more eliminations.

In some embodiments, eliminating one or more of the defect reports from the plurality of defect reports includes:
(i) automatically gathering one or more of the plurality of attributes from the test environment;
(ii) determining, based on at least an automatically gathered attribute selected by a given defect report from the automatically gathered attributes, that a given previously discovered defect, which is documented by the given defect report, did not cause the test failure and eliminating the given defect report from the plurality of defect reports; and
(iii) determining, based on at least a provided attribute selected by another defect report from the plurality of attributes that were not automatically gathered in response to the test failure, that another previously discovered defect, which is documented by the other defect report, did not cause the test failure and eliminating the other defect report from the plurality of defect reports, wherein the provided attribute is retrieved from the test environment during the determination of the other defect report by invoking a given provider script that is specified by the other defect report.

In some embodiments, determining that the other previously discovered defect did not cause the test failure and eliminating the other defect report from the plurality of defect reports includes:
(i) in response to receiving, from the other defect report, a rule that references the provided attribute, invoking the given provider script to retrieve the provided attribute from the test environment;
(ii) evaluating the rule with the provided attribute to determine whether the test environment matches the rule; and
(iii) in response to determining that the test environment does not match the rule, eliminating the other defect report from the plurality of defect reports.

In some embodiments, testing the software program in the test environment includes performing, at a test harness, a set of tests over the software program in the test environment.

In some embodiments, the test failure includes a crash that occurred in response to the performance of the set of tests.

In some embodiments, the provider script includes one of a shell script, an executable, and a software service that is accessed over a network.

In some embodiments, the automatically gathered attribute includes one of an operating system identifier, a disk size, a heap memory size, and an identifier of a test associated with the test failure.

In some embodiments, the provided attribute includes one of a maximum number of threads, a kernel version, a stack trace associated with the test failure, and a crash line associated with the test failure.

In some embodiments, each defect report in the plurality of defect reports is defined by an engineer to be used in a failure diagnosis system.

In some embodiments, each defect report in the plurality of defect reports is defined using one of a file comprising plain text, a file comprising extensible markup language (XML), and a graphical user interface provided by the failure diagnosis system.

In some embodiments, associating the test failure with the defect report that remains after the one or more eliminations includes when a single defect report remains after the one or more eliminations, outputting a link to the defect report.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and testing of a software program. More specifically, the disclosed embodiments provide a method and system for building relationships between test failures, which are obtained from testing the software program, and defect reports, which describe defects in the software program. A test failure may be produced during testing when, during a test execution and/or as a result of a test execution, the tested software code behaves incorrectly, returns an incorrect value, throws a checked or an unchecked exception, and/or causes a crash. By forming relationships between test failures and defect reports, the system may provide developers with various insights. For example, if a test failure is determined to be related to a single defect report, developers may infer that the defect represented by the defect report is the root cause of the test failure and fixing this defect will prevent the test failure from recurring. If the test failure is not found to be related to any defect reports, developers may infer that the test failure is due to a new and/or previously undetected defect in the software program. This may occur in situations where a new defect was introduced in the latest build of the software program. Additionally, if the test failure is determined to be related to multiple defect reports, developers may infer that there are duplicate defect reports filed within the report repository.

During operation, the system may receive test results that are produced from testing the software program in a test environment. Test failures may be detected within the test results. For a given test failure, the system may then access defect reports that are associated with the software program via the report repository. The system may then select a subset of the associated defect reports, wherein each defect report in the subset is referred to as a candidate defect report. Candidate defect reports are defect reports with generic rules that match one or more generic attributes of the test environment. If no candidate defect reports are found, developers may: (1) file new defect reports or modify the generic rules of existing defect reports; and (2) retest the software program to see if one of the new/updated defect reports matches the test environment.

If one or more candidate defect reports are found, the system may then execute the provider scripts of the candidate defect report to obtain custom attributes of the test environment. Based on which candidate defect reports possess custom rules that match the test environment, the system may find one or more related defect reports among the candidate defect reports. Related defect reports are candidate defect reports with custom rules that match one or more custom attributes of the test environment. If exactly one related defect report is found, developers may infer that the test failure is caused by the defect represented by the related defect report. If no related defect reports are found, developers may infer that the test failure is due to a new and/or previously undetected defect in the software program. In response, developers may file new defect reports, or modify existing defect reports to have rules that match the test environment. If multiple defect reports are selected, developers may infer that (1) there are duplicate defect reports and/or (2) two or more defect reports overlap one another in some fashion. In response, developers may close duplicate defect reports or modify existing defect reports to no longer overlap with one another.

Figure 1:
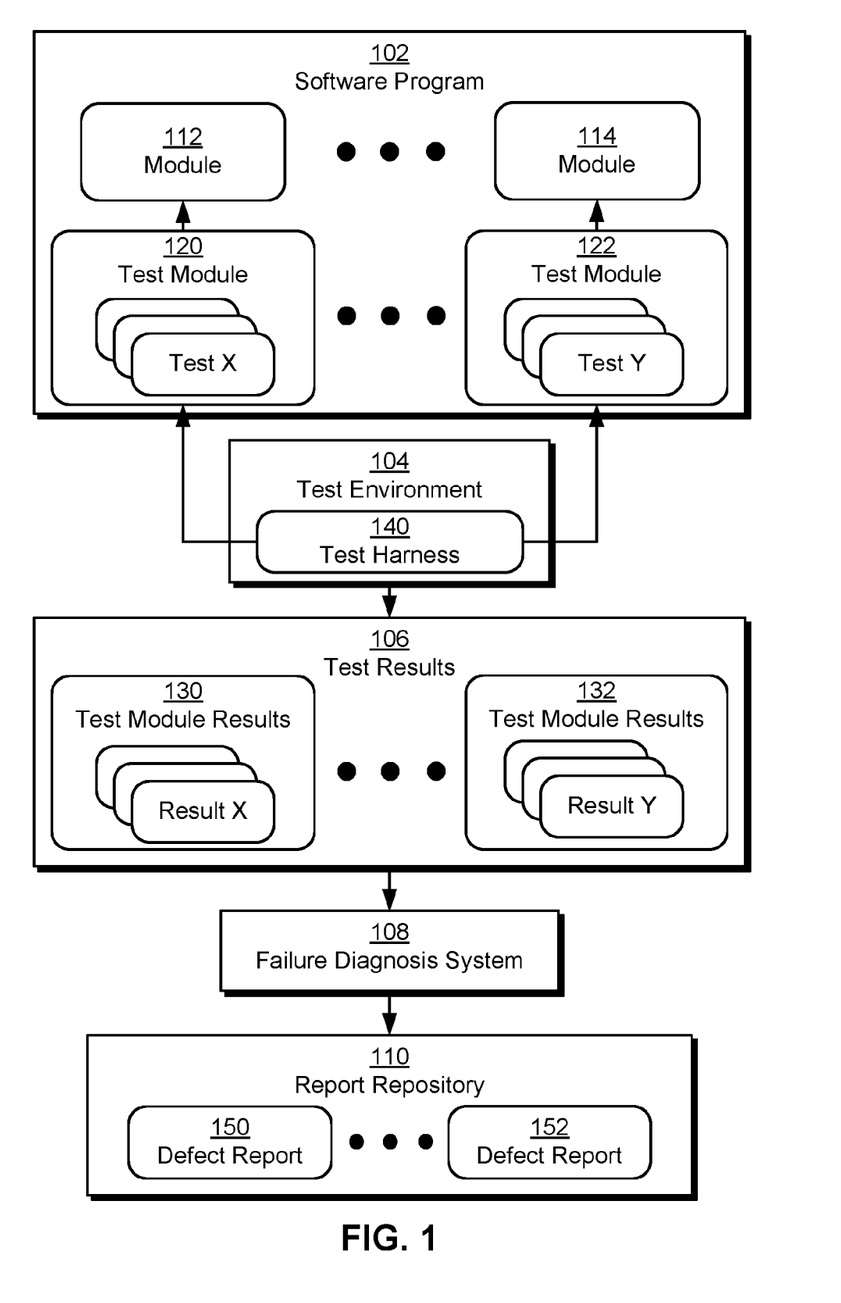
FIG. 1 shows a schematic of a system in accordance with the disclosed embodiments.

FIG. 1 shows a schematic of a system in accordance with the disclosed embodiments. The system may be used to facilitate the development and testing of software program 102. More specifically, the system may include functionality to determine relationships between test failures found in test results 106 and defect reports 150-152. As shown in FIG. 1, the system includes software program 102, test environment 104, test harness 140, test results 106, failure diagnosis system 108, and report repository 110. Each of these components is described in further detail below.

Software program 102 may be a standalone application, operating system, enterprise application, database, library, device driver, and/or other type of software. In addition, software program 102 may be executed in a variety of environments. For example, software program 102 may be executed on a single desktop computer or workstation, or software program 102 may be distributed across multiple servers within a data center. Along the same lines, software program 102 may be executed sequentially or in parallel on one or more processors and/or processor cores.

Software program 102 may also execute independently of the platform of the computer system on which software program 102 executes. For example, a virtual machine such as a Java (Java™ is a registered trademark of Oracle America, Inc.) Virtual Machine (JVM) may be used to execute software program 102 on the computer system regardless of the operating system, drivers, and/or hardware on the computer system. Furthermore, prior to compilation, software program 102 may include software code that is organized into modules 112-114 and test modules 120-122. Modules 112-114 may include software code that implements functionality of software program 102. Test modules 120-122 may include software code that implements tests for verifying the correctness of modules 112-114.

Test harness 140 may be a program, test framework, set of scripts and/or tools, software service located in the cloud, and/or other type of software system configured to verify the correctness, availability while under heavy load, and/or robustness of modules 112-114 by executing tests of test modules 120-122. For example, test harness 140 may be part of a unit testing framework such as JUnit™, NUnit™, TestNG™, Google Test™, or Spock™. Alternatively, test harness 140 may be part of an integration testing framework such as Citrus™ or Arquillian™.

Additionally, test harness 140 may execute tests of test modules 120-122 to obtain test module results 130-132 respectively. The tests provided by test modules 120-122 may be unit tests, integration tests, system tests, stress tests, and/or regression tests. Unit tests are generally simpler test cases written to test individual units of source code. For example, with regards to software programs written in an object-oriented language, a unit test generally tests a single method of a single class. Thus, unit tests generally have a narrow and well-defined scope. Integration tests generally verify correct inter-operation among multiple subsystems that have already undergone unit testing. Thus, integration tests generally test multiple methods, classes, and/or modules in tandem. System tests generally test an entire software program as a black box and are generally applied after integration testing. Stress tests may refer to one or more tests that put emphasis on the software program's robustness, availability, and error handling ability while under heavy load. Regression tests may refer to one or more tests that are created when a defect is fixed. The regression tests then test the software program to ensure that the defect no longer manifests.

Test environment 104 may refer to the software platform and/or the computer system on which test harness 140 executes. For example, test environment 104 may include a platform, operating system, architecture, and/or one or more configuration options for executing test harness 140 within a virtual machine such as a JVM. The platform may include the platform of the execution environment of software program 102 and/or test harness 140, such as a Java Development Kit (JDK) platform. The operating system may specify the operating system in which test harness 140 executes and/or the development and/or testing of software program 102 takes place. The architecture may specify the hardware architecture of the computer system on which software program 102 and/or test harness 140 executes, such as a 32-bit architecture and/or 64-bit architecture. The platform, operating system, architecture, environmental variables, execution paths, run-time optimizations, randomly generated data, multi-threading settings, multi-processing settings, third-party libraries, and/or other characteristics of test environment 104 may be described and/or identified by one or more generic and/or custom attributes of test environment 104.

Test results 106 may be obtained as a result of test harness 140 testing software program 102 in test environment 104. More specifically, test module results 130 may include results of tests from test module 120. Test module results 132 may include results of tests from test module 122. For example, there may be (1) a one-to-one mapping between tests from test module 122 and test results in test module 132, and (2) a one-to-one mapping between tests from test module 120 and test results in test module results 130. Executing test X against module 112 may produce result X and executing test Y against module 114 may produce result Y. In another embodiment, the execution of a plurality of tests from test modules 120-122 may correspond to a single test result, wherein the test result is a success if all the tests return successfully and a failure if one or more of the tests does not execute successfully. It should be noted that a test produces a test failure when, during the test execution and/or as a result of the test execution, the tested software code behaves incorrectly, returns an incorrect value, becomes unavailable, fails to handle an error correctly, throws a checked or an unchecked exception, and/or causes a crash. Conversely, a test produces a successful test result when the tested software code behaves correctly and/or returns a correct value without throwing a checked or an unchecked exception and/or causing a crash.

In some embodiments, after test harness 140 completes a test run, test harness 140 may store test results 106 in memory, in a database, in the file system, and/or in some other type of data repository for later retrieval and/or use by other components of the system. Each test result of test results 106 may include information that indicates whether the test result is a success or a failure.

Failure diagnosis system 108 may be a program, framework, set of scripts and/or tools, software service located in the cloud, and/or other type of software system configured to analyze test failures produced by test harness 140. More specifically, subsequent to test harness 140 completing a test run and making test results 106 available to failure diagnosis system 108, the system may attempt to diagnose the cause of each test failure in test results 106. In some embodiments, failure diagnosis system 108 may be an executable or a script located in the file system. After finishing a test run, test harness 140 may automatically invoke the executable or script, passing the test results as a parameter. In another embodiment, failure diagnosis system 108 may be a software service, such as a RESTful application programming interface (API), located in the cloud. Test harness 140 may make a request to the software service and upload the test results as a parameter. In yet another embodiment, failure diagnosis system 108 may be integrated into test harness 140 and serve as a post-processing step for test harness 140's output. In yet another embodiment, failure diagnosis system 108 may be a separate background process that monitors a memory space, a database, a file, and/or another type of data repository that receives test results 106 from test harness 140. When the background process detects that test harness 140 has finished a test run, the background process may automatically retrieve and process the latest test results from the monitored location. Failure diagnosis system 108 is discussed in further detail below with respect to FIGS. 2-3.

Report repository 110 may be a program, framework, software service located in the cloud, and/or other type of software system configured to store and manage defect reports. During the development of software program 102, defects may be introduced into the software program. When a defect is discovered in software program 102, a developer may file, in report repository 110, a defect report that represents and/or describes the defect. Developers generally file defect reports manually. Additionally, a script may automatically file one or more of the defect reports on behalf of the developers. As shown in FIG. 1, report repository 110 includes a plurality of defect reports, defect reports 150-152, each of which refers to an existing or previously existing defect in software program 102. Defect report 150 may include a generic rule, a custom rule, and/or a provider script. Generic rules, custom rules, and/or provider scripts may include lines of script and/or software code written inside defect reports. In some embodiments, generic rules, custom rules, and/or provider scripts refer to shell scripts and/or processes external to report repository 110. Generic rules, custom rules, and provider scripts are discussed in further detail below with respect to FIGS. 2-3.

In some embodiments, report repository 110 provides a subset of functionality generally provided by a defect tracking system such as Bugzilla™ or Trac™. For example, in addition to a generic rule, a custom rule, and a provider script, a defect report filed at report repository 110 may include the defect report's identifier, the defect report's title, a description of the defect, the defect report's creation date, the identity of the defect report's creator and/or filer, the identity of the developer assigned to fix the defect, and/or the defect's severity. Report repository 110 may provide a command-line interface (CLI) and/or a graphical user interface (GUI) that facilitates developer interaction with report repository 110. If the report repository is a native application, the GUI may include one or more graphical screens. If the report repository is a software service located in the cloud, the GUI may include one or more graphical web pages. In all cases, the GUI may provide an intuitive process for filing a defect report, wherein the process includes the use of drop-down lists, text boxes, checkboxes, and other forms that enable a developer to input a comprehensive description of a defect. Report repository 110 may then store the defect report in memory, in a database, in the file system, and/or some other type of data repository for later retrieval.

In some embodiments, report repository 110 exists as a separate software component that is designed to work with a separate defect tracking system such as Bugzilla or Trac. In some embodiments, one or more bug reports in the defect tracking system may refer to defect reports in report repository 110. Alternatively, one or more defect reports in report repository 110 may refer to bug reports in the defect tracking system. For example, there may be a one-to-one mapping between bug reports in the defect tracking system and defect reports 150-152. In this arrangement, report repository 110 may store defect reports in a text file that includes plain text, scripting language, software code, and/or extensible markup language (XML). Report repository 110 is discussed in further detail below with respect to FIGS. 2-3.

Those skilled in the art will appreciate that the system of FIG. 1 may be implemented in a variety of ways. First, software program 102, test environment 104, test harness 140, test results 106, failure diagnosis system 108, and report repository 110 may exist on a single physical machine, multiple computer systems, one or more virtual machines (e.g., JVMs), a grid, and/or a cloud computing system. In addition, test harness 140, failure diagnosis system 108, and report repository 110 may be implemented together and/or separately by one or more hardware and/or software components and/or layers.

Figure 2:
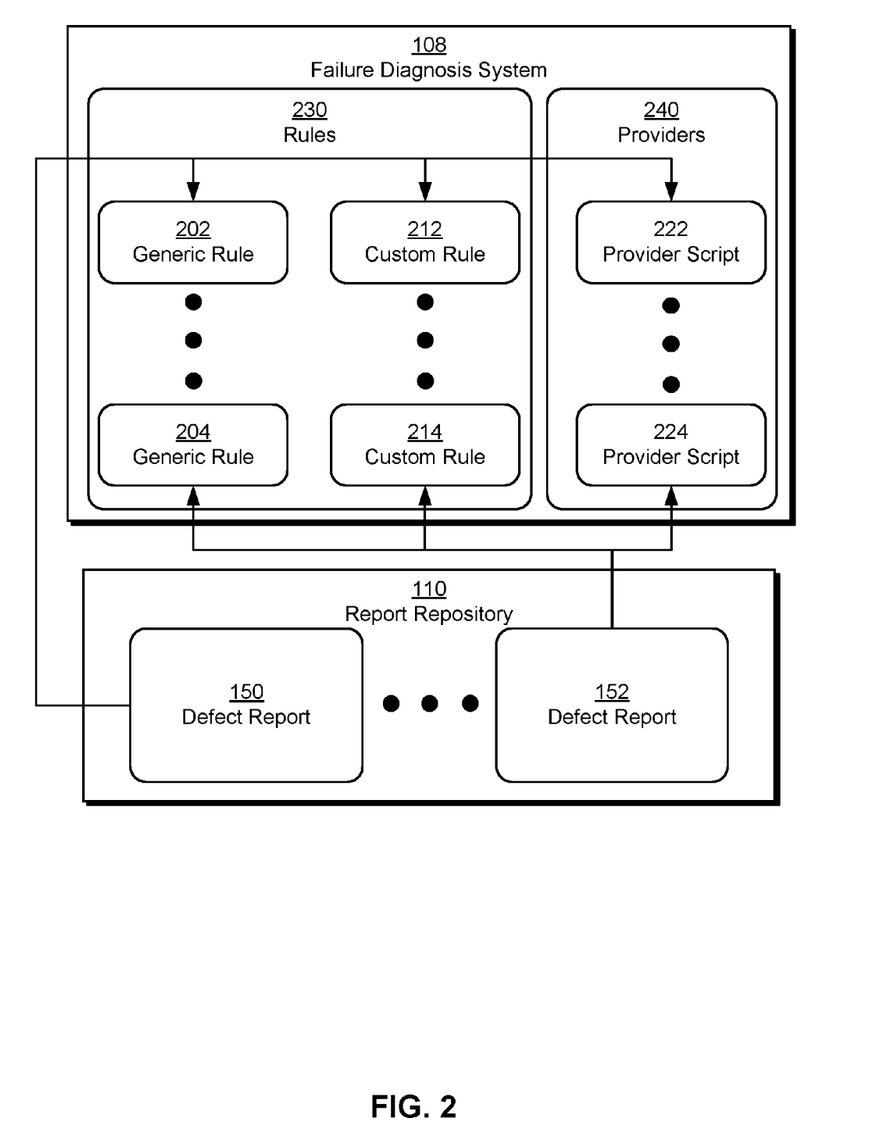
FIG. 2 shows the generation of a memory layout of an object instance in a software program in accordance with the disclosed embodiments.

FIG. 2 shows another schematic of the system that focuses on interactions between failure diagnosis system 108 and report repository 110. As shown in FIG. 2, to diagnose a test failure obtained from test harness 140, failure diagnosis system 108 may attempt to match the test failure with one of defect reports 150-152. Through report repository 110, failure diagnosis system 108 may access one or more defect reports that are associated with software program 102. Failure diagnosis system 108 may retrieve and/or extract a generic rule, a custom rule, and a provider script from each associated defect report. Thus, as shown in FIG. 2, rules 230 may be populated with generic rules 202-204 and/or custom rules 212-214 obtained from the associated defect reports. In particular, rules 230 may receive (1) generic rule 202 and custom rule 212 from defect report 150 and (2) generic rule 204 and custom rule 214 from defect report 152. Additionally, as shown in FIG. 2, providers 240 may be populated with provider scripts 222-224 obtained from the associated defect reports. In particular, providers 240 may receive provider script 222 from defect report 150 and provider script 224 from defect report 152.

Figure 3:
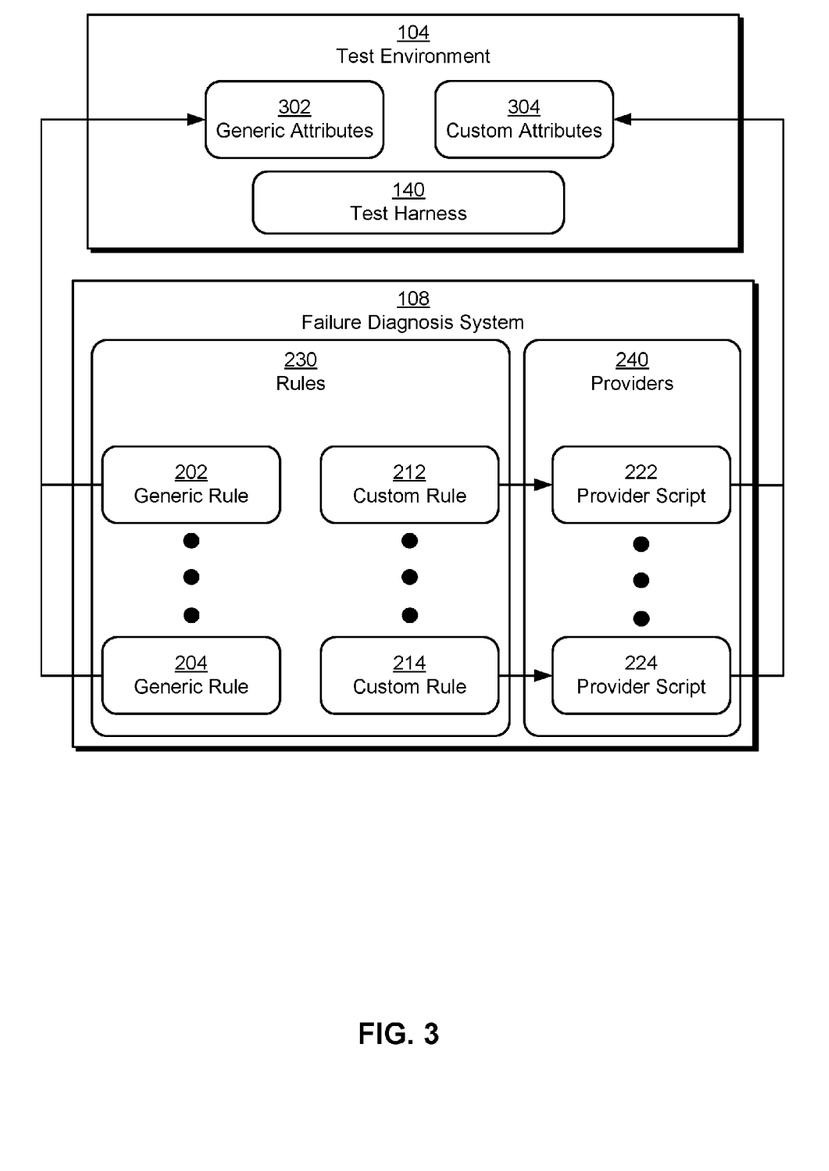
FIG. 3 shows the identification of an improvement to the memory usage of a software program in accordance with the disclosed embodiments.

FIG. 3 shows another schematic of the system that focuses on interactions between failure diagnosis system 108 and attributes found in test environment 104. As shown in FIG. 3, to diagnose the test failure obtained from test harness 140, failure diagnosis system 108 may use generic rules 202-204 and custom rules 212-214 to find a single defect report that most closely matches the test failure. More specifically, out of the defect reports associated with software program 102, (1) some of the defect reports may be eliminated due to their generic rules not matching test environment 104, (2) still more of the defect reports may be eliminated due to their custom rules not matching test environment 104, and (3) the remaining defect report represents a defect that is likely related to the test failure's root cause. Additionally, as shown in FIG. 3, generic attributes (generic attributes 302) and custom attributes (custom attributes 304) may define and/or describe environmental variables, aspects of the underlying computer system, the test failure, the test that produced the test failure, the test harness, the software program, and other characteristics that describe test environment 104. How these attributes are used by rules 230 is further described below.

Generic attributes 302 and custom attributes 304 may describe the conditions under which the test failure occurred. In some embodiments, generic attributes differ from custom attributes in that generic attributes are obtained from a generic test environment information (GTEI) object, without the assistance of a provider script. Generic attributes may refer only to information that was automatically gathered during, prior to, and/or in response to the test failure. In contrast, custom attributes may refer to other information that is not gathered automatically or in response to the test failure. In some embodiments, custom attributes refer to information that is obtained using a provider script when a custom rule is evaluated. In other words, custom attributes 304 may include attributes that the GTEI object cannot provide. Thus, it may be more expensive to retrieve a custom attribute from test environment 104 than it is to retrieve a generic attribute from test environment 104. It should be noted that the GTEI object may be created, initialized and provided by any combination of elements shown in FIG. 1.

Generic rules 202-204 may be used by failure diagnosis system 108 as preliminary tests, wherein defect reports whose generic rules fail to match test environment 104 are eliminated. For example, generic rule 202 may include a conditional statement that returns a Boolean value. As shown in FIG. 3, generic rule 202 may access generic attributes (generic attributes 302) by calling methods with the GTEI object. Examples of generic attributes may include the operating system present in test environment 104, the heap size of the computer system on which test environment 104 exists, the disk size of the computer system, and/or the name/identifier of the test that produced the test failure. For example, to obtain the disk size, generic rule 202 may call the getDiskSize method with the GTEI object. To obtain the operating system's identifier, generic rule 202 may call the getOperatingSystem method with the GTEI object.

Furthermore, generic rule 202 may use one or more Boolean operators, conditional functions, and/or conditional operators to form a conditional statement. For example, if the defect described by defect report 150 manifests only in, e.g., a Windows™ operating system that runs on a computer system with a heap size greater than, e.g., four gigabytes, generic rule 202 may include the following conditional statement: "GTEI.getOperatingSystem.contains("Windows") and GTEI.getDiskSize>4 Gb." In evaluating the above conditional statement, if failure diagnosis system 108 determines that test environment 104 (1) does not include the Windows operating system or (2) has a heap size less than four gigabytes, the system may infer that the test failure does not match defect report 150. It should be noted that generic rules may also be referred to as indicator functions.

Custom rules 212-214 may be used by failure diagnosis system 108 as secondary tests, wherein defect reports whose custom rules fail to match test environment 104 are eliminated. For example, custom rule 212 may include a conditional statement that returns a Boolean value. As shown in FIG. 3, because provider scripts are used to obtain custom attributes 304 from test environment 104, custom rule 212 may depend on provider script 222 to obtain custom attributes 304 from test environment 104. Custom rule 212 may attempt to access a custom attribute of test environment 104 by calling a method provided by an additional environment information (AEI) object. In response to the call, the AEI object may invoke provider script 222 to obtain the requested custom attribute from test environment 104. Provider script 222 may refer to any provider of information that is external to failure diagnosis system 108, including: shell scripts, executables, software services located in the cloud, background processes, flat files, and/or databases. For example, to obtain the evaluate count, custom rule 212 may call the getValue method with the AEI object and pass in, e.g., the string "maxThread" as a parameter. The AEI object may then execute the shell script pointed to by provider script 222: getMaxThread.sh. Once the shell script obtains the evaluate count, the AEI object may return the evaluate count to be used in the custom rule's evaluation.

Examples of custom attributes may include the kernel version used by the operating system in test environment 104, the stack trace and/or crash report produced by the test failure, the line in the code that caused the test failure, the method and class that caused the test failure, annotations present in the code, the central processing unit (CPU) architecture in the computer system, and/or other environmental variables and values that are not provided by the GTEI object but otherwise describe test environment 104. Furthermore, custom rule 212 may use one or more Boolean operators, conditional functions, and/or conditional operators to form a conditional statement. For example, if the defect described by defect report 150 manifests only in a test environment with fewer than, e.g., 2048 threads, custom rule 212 may include the following conditional statement: "AEI.getValue ("maxThread")<2048." In evaluating the above conditional statement, if failure diagnosis system 108 determines that test environment 104 can provide more than 2048 threads, the system may infer that the test failure does not match defect repot 150. It should be noted that custom rules may also be referred to as additional criteria functions.

Thus, defect report 150 may specify generic rule 202, custom rule 212, and provider script 222 as follows:

```
defect report #1
    Indicator function:
        GTEI.getOperatingSystem.contains("Windows") and
        GTEI.getDiskSize > 4 Gb
    Additional criteria function:
        AEI.getValue("maxThread") < 2048
    Additional environment information provider:
        getMaxThread.sh
    Comments:
        too few maximum threads
```

As seen above, defect report 150 (1) has the title "defect report #1," (2) includes a generic rule that matches a test environment with, e.g., a Windows operating system and a heap memory size of greater than, e.g., four gigabytes, (3) includes a custom rule that matches a test environment that provides fewer than, e.g., 2048 threads, (4) includes a provider script that references the getMaxThread.sh shell script, and (5) includes comments that describe the defect.

Defect reports may decline to specify a custom rule. For example, a defect report may include the following:

```
defect report #2
    Indicator function:
        GTEI.getOperatingSystem.contains("Windows") and
        GTEI.getDiskSize > 4 Gb
    Additional criteria function:
        empty
    Additional environment information provider:
        empty
    Comments:
        Windows with large heap is not supported yet
```

As shown above, while this defect report specifies a generic rule, the defect report does not specify a custom rule. As expected, the defect report also fails to specify a provider script for obtaining custom attributes because none are requested. In some embodiments, a defect report may specify a custom rule and a provider, but decline to specify a generic rule.

A defect report may specify a custom rule that references both generic attributes and custom attributes. For example, the defect may include the following:

```
defect report #3
    Indicator function:
        GTEI.getOperatingSystem.contains("Linux") or
        GTEI.getOperatingSystem.contains("Solaris") and
        GTEI.getTestName.contains("specjvm98")
    Additional criteria function:
        (GTEI.getOperatingSystem.contains("Linux") and
        (AEI.getValue("cpuArch").contains("armv5")) or
        (GTEI.getOperatingSystem.contains("Solaris") and
        (AEI.getValue("cpuArch").contains("armv6") or
        AEI.getValue("cpuArch").contains("armv9")))
    Additional environment information provider:
        getCPUArch.sh
```

-continued

Comments:
    specjvm98 fails on certain architectures

The defect report shown above specifies a generic rule that returns true if the operating system is, e.g., either Linux or Solaris and the name of the test that caused the failure is, e.g., "specjvm98." The defect report specifies a custom rule that returns true if (1) the operating system is, e.g., Linux and the CPU architecture is, e.g., ARMv5 or (2) the operating system is, e.g., Solaris and the CPU architecture is, e.g., either ARMv6 or ARMv9. As shown above, the custom rule references both generic and custom variables. It should also be noted that the generic rule is written to ensure that test failures occurring in operating systems other than Linux and Solaris are eliminated before the custom rule is used and/or the provider script is executed. By executing provider scripts only when the generic rule return true, work performed by the computer system may be reduced.

Figure 4:
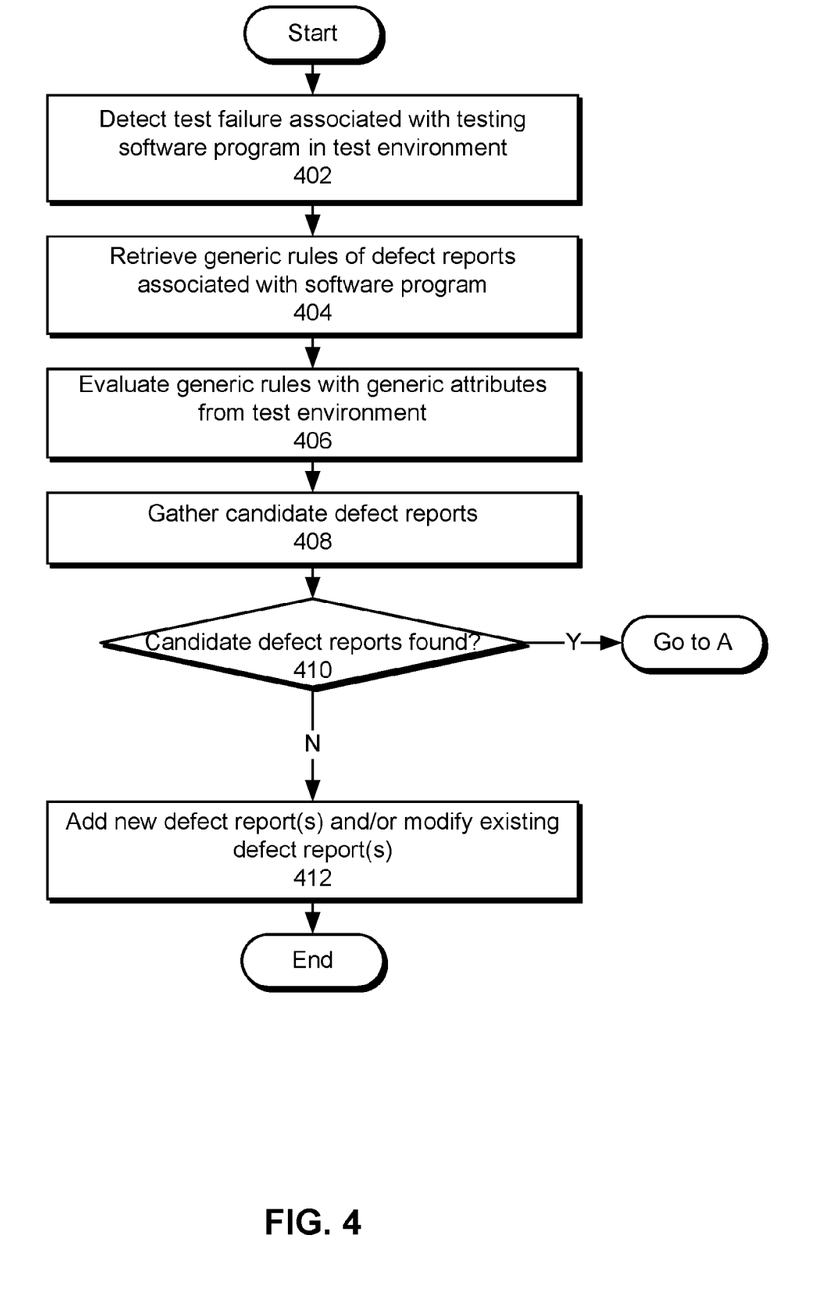
FIG. 4 shows a flowchart illustrating the process of facilitating the development and testing of a software program in accordance with the disclosed embodiments.

FIG. 4 shows a flowchart illustrating the process of facilitating the development and testing of a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, the failure diagnosis system obtains test results that were produced by the test harness while performing a test run on the software program. The tests making up the test run may be part of one or more test modules, as described above with respect to FIG. 1. Next, one or more test failures may be detected in the test results. For example, if the test results are obtained from a log file, test failures may be detected by parsing the text file for particular strings generated in response to an exception or a crash (operation 402). If the test results are obtained from a database, test failures may be detected via a table column that indicates whether a test result is a success or a failure. In some embodiments, a test harness may provide the failure diagnosis system with the test failures directly by invoking the failure diagnosis system and passing the test failures as a parameter.

Next, for the first test failure of the set of test failures detected in the test results, the failure diagnosis system may access generic rules of defect reports, which are associated with the software program, from the report repository (operation 404). For example, if the report repository is implemented as a text file, the failure diagnosis system may extract the generic rule of a defect report by searching for a line with the string, e.g., "Indicator function" and extracting the remaining text in the line, wherein the remaining text makes up the generic rule. The failure diagnosis system may repeat this operation until it reaches the end of the text file.

The failure diagnosis system may then evaluate each generic rule using generic attributes of the test environment (operation 406). Because generic rules are conditional statements, the failure diagnosis system may evaluate the conditional statement of a generic rule to obtain a Boolean value. In evaluating the conditional statement, the failure diagnosis system may make one or more method calls with the GTEI object to obtain one or more generic attributes from the test environment. For example, if the failure diagnosis system encounters a generic rule that includes: "GTEI.getOperatingSystem.contains("Windows") and GTEI.getDiskSize>4 Gb," executing the generic rule invokes a call to the getOperatingSystem method with the GTEI object. The return value of the call is then compared to the string, e.g., "Windows." If the strings match, a call is made to the getDiskSize method with the GTEI object. The return value of the call is then compared to, e.g., the value four. If the return value is greater than 4, the generic rule returns true. As a result, the generic rule evaluates to true.

Next, the failure diagnosis system may gather candidate defect reports (operation 408). Defect reports whose generic rules evaluate to true are referred to as candidate defect reports. Thus, the failure diagnosis system may gather all defect reports whose generic rules returned true using generic attributes of the test environment. Generally, the set of candidate defect reports is a subset of the set of defect reports associated with the software program.

As a result, the failure diagnosis system may gather one or more candidate defect reports (operation 410). If the number of candidate defect reports is one or more, the failure diagnosis system may proceed to evaluate the custom rules of the one or more candidate defect reports (see FIG. 5 below). In some embodiments, if the number of candidate defect reports is exactly one, the failure diagnosis system may associate the candidate defect report with the test failure's cause without evaluating the candidate defect report's custom rule.

If no candidate defect reports are found, however, then the failure diagnosis system may end its analysis of the current test failure without associating any defect report with the test failure's cause. The failure diagnosis system may proceed to diagnose the next test failure in the set of detected test failures. In any case, the failure diagnosis system may inform the developers of the failure to associate the test failure with a defect report because none of the defect reports had generic rules that evaluated to true. In response, developers may infer that the test failure is due to a new defect for which a defect report has yet to be filed in the report repository. Next, the developers may investigate the test failure and file one or more new defect reports with generic rules that would return true using attributes from the test failure's test environment or modify the generic rules of existing defect reports (operation 412). Next, the developers may execute another test run in an attempt to reproduce the test failure and allow the failure diagnosis system to associate the test failure with a new/modified defect report.

Figure 5:
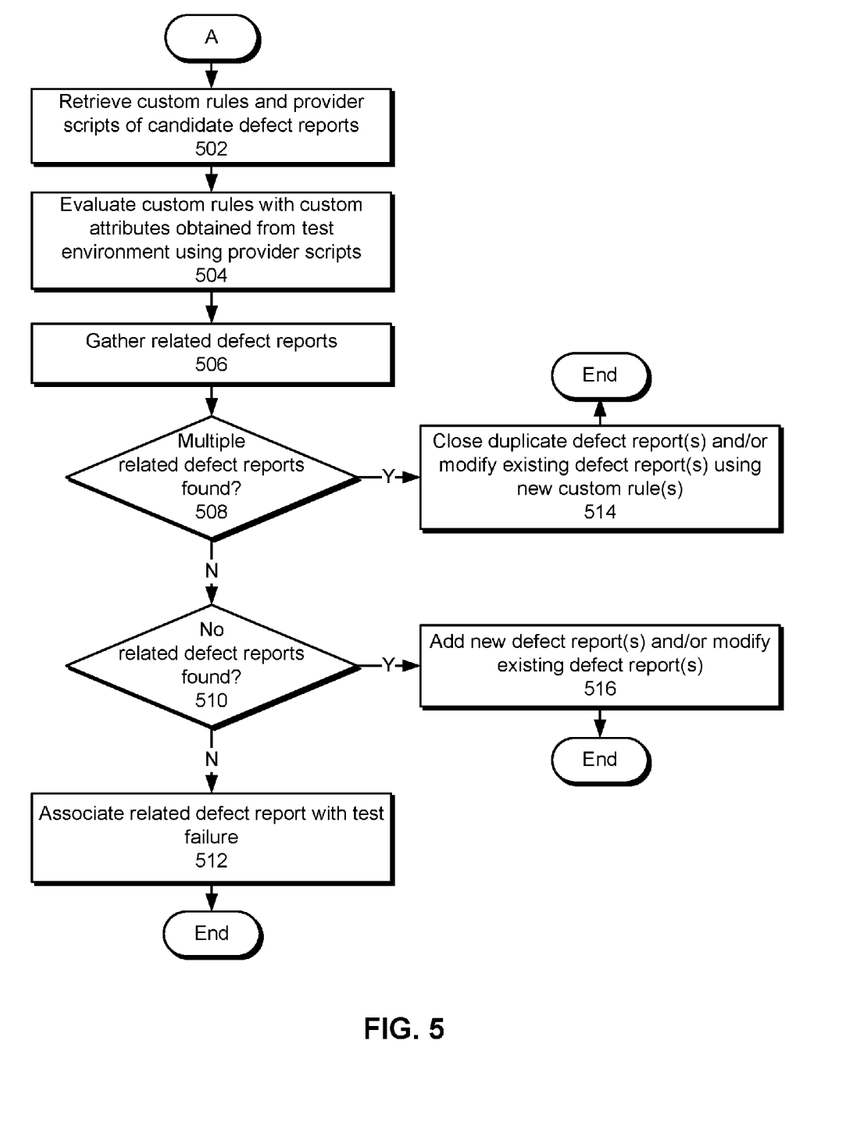
FIG. 5 shows a flowchart illustrating the process of facilitating the development and testing of a software program in accordance with the disclosed embodiments.

FIG. 5 shows a flowchart illustrating the process of facilitating the development and testing of a software program in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

After gathering one or more candidate defect reports (see FIG. 4 above), the failure diagnosis system may obtain custom rules and provider scripts of the candidate defect reports (operation 502). For example, if the report repository is implemented as a text file, the failure diagnosis system may extract the custom rule of a defect report by searching for the string, e.g., "Additional criteria function" and extracting the remaining text in the line, wherein the remaining text makes up the custom rule. The failure diagnosis system may then extract the provider script of each defect report by searching for the string, e.g., "Additional environment information provider" and obtaining the filename of the shell script that appears in the line. The failure diagnosis system may repeat this operation until it reaches the end of the text file.

The failure diagnosis system may then evaluate each custom rule using custom attributes of the test environment, wherein the custom attributes are obtained using provider scripts (operation 504). More specifically, after obtaining the filename of the provider script of a custom attribute, the failure diagnosis system may execute the provider script and store the output of the provider script into the AEI object. Further, the failure diagnosis system may execute the conditional statement of the custom rule. Because custom rules may reference both generic attributes and custom attributes of the test environment, the failure diagnosis system may make one or more calls to methods with the GTEI object to retrieve generic attributes and/or to methods with the AEI object to retrieve custom attributes when evaluating the custom rule.

For example, if the custom rule includes: "AEI.getValue ("maxThread")<2048" and the provider script references the shell script getMaxThread.sh, evaluating the custom rule first calls the getValue method with the AEI object with the string, e.g. "maxThread" as a parameter. Next, the AEI object invokes the getMaxThread.sh shell script to obtain the test environment's evaluate count. The evaluate count is then compared to the value, e.g., 2048. If the evaluate count is less than 2048, the custom rule evaluates to true.

Next, the failure diagnosis system may gather related defect reports (operation 506). Candidate defect reports whose custom rules evaluate to true are referred to as related defect reports. Thus, the failure diagnosis system may gather all candidate defect reports whose custom rules returned true using generic and custom attributes of the test environment. Generally, the set of related defect reports is a subset of the set of candidate defect reports.

As a result, the failure diagnosis system may gather one or more related defect reports. If the number of related defect reports is more than one (operation 508), the failure diagnosis system may end its analysis of the current test failure without associating any defect report with the test failure's cause. The failure diagnosis system may proceed to diagnose the next test failure of the set of test failures. In any case, the failure diagnosis system may inform the developers of the failure to associate the test failure with a defect report because too many candidate defect reports have custom rules that evaluate to true. In response, the developers may infer that there may be duplicate defect reports filed for a defect. Then, the developers may close one or more duplicate defect reports or modify the custom rules of one or more existing defect reports so that no more than one defect report in the report repository has both a generic rule and a custom rule that match the test failure's test environment (operation 514). Next, the developers may execute another test run in an attempt to reproduce the test failure.

If the number of related defect reports is zero (operation 510), the failure diagnosis system may end its analysis of the current test failure without associating a defect report with the test failure. The failure diagnosis system may proceed to diagnose the next test failure in the set of test failures. In any case, the failure diagnosis system may inform the developers of the failure to associate the test failure with a defect report because none of the candidate defect reports had a custom rule that evaluated to true. In response, the developers may infer that the test failure is due to a new defect for which a defect report has yet to be filed. Next, the developers may investigate the test failure and (1) file one or more new defect reports with generic rules and custom rules that match the test failure's test environment, or (2) modify one of the custom rules of existing defect reports (operation 516) to match the test environment. Next, the developers may execute another test run in an attempt to reproduce the test failure.

If the number of related defect reports is equal to one, the failure diagnosis system may associate the related defect report with the root cause of the test failure (operation 512). More specifically, the failure diagnosis system may inform developers that the root cause of the test failure is the defect represented by the related defect report. In some embodiments, the failure diagnosis system may communicate the association via output in a command line interface. In some embodiments, the failure diagnosis system may provide a link to the defect report stored in the report repository. In some embodiments, the failure diagnosis system may record the test failure and append the record to the defect report.

Those skilled in the art will appreciate that as developers continue to add new defect reports and modify rules within existing defect reports to encourage a one-to-one mapping between test failures and defect reports, the failure diagnosis system may become more proficient at diagnosing test failures produced while testing the software program, thereby conserving developer time and speeding development of the software program.

It should be noted that in an alternative embodiment, the failure diagnosis system may finish processing an initial defect report before accessing a subsequent defect report in the report repository. For example, if the report repository is implemented as a text file, after encountering the initial defect report in the text file, the failure diagnosis system may process both the generic and custom rules of the initial defect report before continuing to read down the text file for subsequent defect reports.

Figure 6:
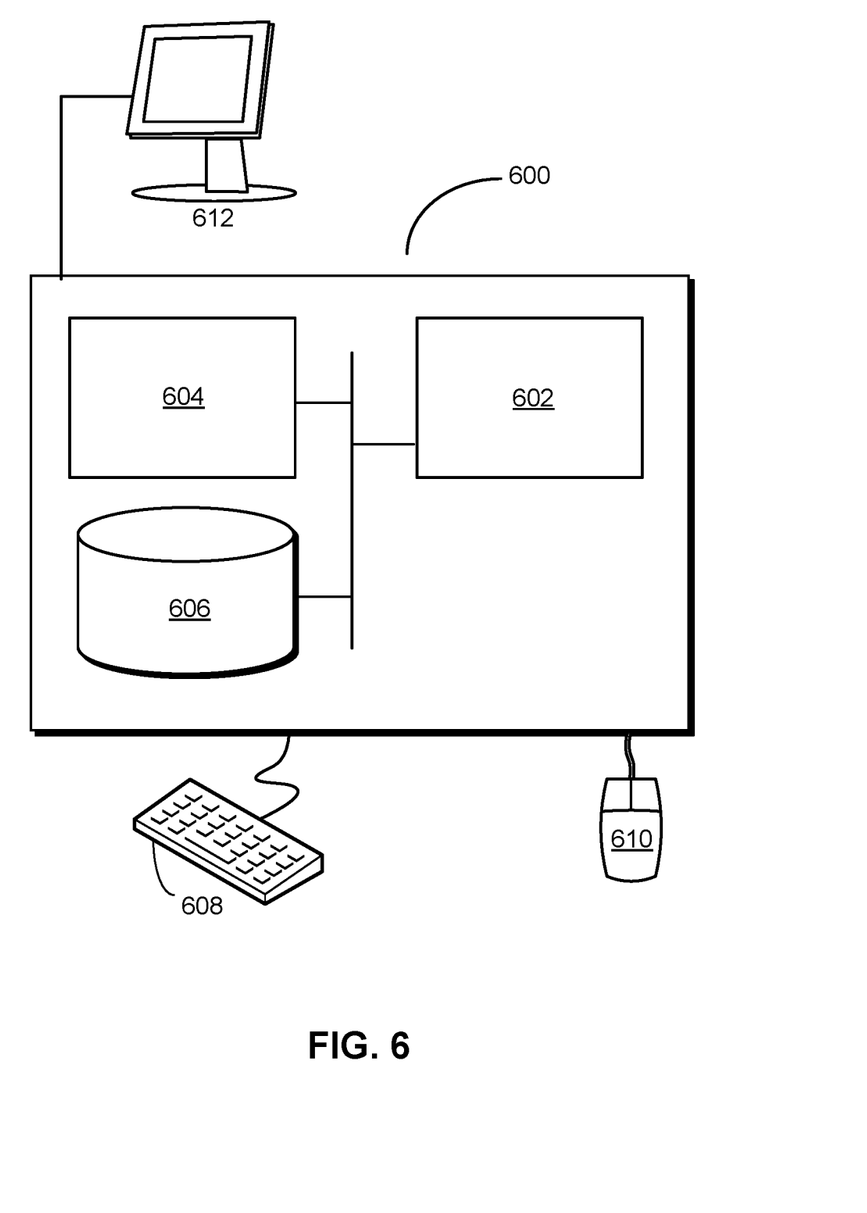
FIG. 6 shows a computer system in accordance with the disclosed embodiments.

FIG. 6 shows a computer system 600 in accordance with an embodiment. Computer system 600 may correspond to an apparatus that includes a processor 602, memory 604, storage 606, and/or other components found in electronic computing devices such as personal computers, laptop computers, workstations, servers, mobile phones, tablet computers, and/or portable media players. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating the development and testing of a software program. The system may include a diagnostic apparatus that detects a test failure associated with testing a software program in a test environment. The diagnostic apparatus then selects, from a set of defect reports associated with the software program, a defect report based on at least one attribute of the test environment. The diagnostic apparatus then associates the selected defect report with a cause of the test failure.

In addition, one or more components of computer system 600 may be remotely located and connected to the other components over a network. Portions of the present embodiments (e.g., diagnostic apparatus, etc.) may also be located on different nodes of a distributed system that implements the embodiments. For example, the present embodiments may be implemented using a cloud computing system that facilitates the development and testing of a software program.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
   receiving and storing a plurality of defect reports associated with a software program, wherein each defect report documents a previously discovered defect in the software program;
   testing the software program in a test environment that comprises an operating system executing upon a computer, and a software development platform, wherein the software program has a plurality of attributes each associated with at least one of the operating system, the computer, and the software development platform; and
   responsive to detecting a given test failure of the software program while testing the software program:
      eliminating, based on attributes selected by the defect reports from the plurality of attributes, one or more of the defect reports from the plurality of defect reports, wherein at least one of the selected attributes is retrieved from the test environment during the determination by invoking a provider script that is specified by one of the defect reports, and wherein eliminating one or more of the defect reports from the plurality of defect reports comprises:
         automatically gathering one or more of the plurality of attributes from the test environment; and
         determining, based on at least an automatically gathered attribute selected by a given defect report from the automatically gathered attributes, that a given previously discovered defect, which is documented by the given defect report, did not cause the test failure and eliminating the given defect report from the plurality of defect reports; and
      associating the test failure with a defect report that remains after the one or more eliminations.

2. The computer-implemented method of claim 1, wherein eliminating one or more of the defect reports from the plurality of defect reports further comprises:
   determining, based on at least a provided attribute selected by another defect report from the plurality of attributes that were not automatically gathered in response to the test failure, that another previously discovered defect, which is documented by the other defect report, did not cause the test failure and eliminating the other defect report from the plurality of defect reports, wherein the provided attribute is retrieved from the test environment during the determination of the other defect report by invoking a given provider script that is specified by the other defect report.

3. The computer-implemented method of claim 2, wherein determining that the other previously discovered defect did not cause the test failure and eliminating the other defect report from the plurality of defect reports comprises:
   responsive to receiving, from the other defect report, a rule that references the provided attribute, invoking the given provider script to retrieve the provided attribute from the test environment;
   evaluating the rule with the provided attribute to determine whether the test environment matches the rule; and
   responsive to determining that the test environment does not match the rule, eliminating the other defect report from the plurality of defect reports.

4. The computer-implemented method of claim 1,
   wherein testing the software program in the test environment comprises performing, at a test harness, a set of tests over the software program in the test environment; and
   wherein the test failure comprises a crash that occurred in response to the performance of the set of tests.

5. The computer-implemented method of claim 1, wherein the provider script comprises one of:
   a shell script;
   an executable; and
   a software service that is accessed over a network.

6. The computer-implemented method of claim 2, wherein the automatically gathered attribute comprises one of:
   an operating system identifier;
   a disk size;
   a heap memory size; and
   an identifier of a test associated with the test failure.

7. The computer-implemented method of claim 2, wherein the provided attribute comprises one of:
   a maximum number of threads;
   a kernel version;
   a stack trace associated with the test failure; and
   a crash line associated with the test failure.

8. The computer-implemented method of claim 1, wherein each defect report in the plurality of defect reports is defined by an engineer to be used in a failure diagnosis system.

9. The computer-implemented method of claim 8, wherein each defect report in the plurality of defect reports is defined using one of:
   a file comprising plain text;
   a file comprising extensible markup language (XML); and
   a graphical user interface provided by the failure diagnosis system.

10. The computer-implemented method of claim 1, wherein associating the test failure with the defect report that remains after the one or more eliminations comprises when a single defect report remains after the one or more eliminations, outputting a link to the defect report.

11. An apparatus, comprising:
    one or more processors; and
    memory storing instructions that, when executed by the one or more processors, cause the apparatus to:
       receive and store a plurality of defect reports associated with a software program, wherein each defect report documents a previously discovered defect in the software program;
       test the software program in a test environment that comprises an operating system executing upon a computer, and a software development platform, wherein the software program has a plurality of attributes each associated with at least one of the operating system, the computer, and the software development platform; and responsive to detecting a given test failure of the software program while testing the software program:

eliminate, based on attributes selected by the defect reports from the plurality of attributes, one or more of the defect reports from the plurality of defect reports, wherein at least one of the selected attributes is retrieved from the test environment during the determination by invoking a provider script that is specified by one of the defect reports, and wherein eliminating one or more of the defect reports from the plurality of defect reports comprises:

automatically gathering one or more of the plurality of attributes from the test environment; and determining, based on at least an automatically gathered attribute selected by a given defect report from the automatically gathered attributes, that a given previously discovered defect, which is documented by the given defect report, did not cause the test failure and eliminating the given defect report from the plurality of defect reports; and associate the test failure with a defect report that remains after the one or more eliminations.

12. The apparatus of claim 11, wherein eliminating one or more of the defect reports from the plurality of defect reports further comprises:

determining, based on at least a provided attribute selected by another defect report from the plurality of attributes that were not automatically gathered in response to the test failure, that another previously discovered defect, which is documented by the other defect report, did not cause the test failure and eliminating the other defect report from the plurality of defect reports, wherein the provided attribute is retrieved from the test environment during the determination of the other defect report by invoking a given provider script that is specified by the other defect report.

13. The apparatus of claim 12, wherein determining that the other previously discovered defect did not cause the test failure and eliminating the other defect report from the plurality of defect reports comprises:

responsive to receiving, from the other defect report, a rule that references the provided attribute, invoking the given provider script to retrieve the provided attribute from the test environment;

evaluating the rule with the provided attribute to determine whether the test environment matches the rule; and responsive to determining that the test environment does not match the rule, eliminating the other defect report from the plurality of defect reports.

14. The apparatus of claim 11, wherein testing the software program in the test environment comprises performing, at a test harness, a set of tests over the software program in the test environment; and wherein the test failure comprises a crash that occurred in response to the performance of the set of tests.

15. The apparatus of claim 11, wherein the provider script comprises one of:

a shell script;
an executable; and
a software service that is accessed over a network.

16. The apparatus of claim 12, wherein the automatically gathered attribute comprises one of:

an operating system identifier;
a disk size;
a heap memory size; and
an identifier of a test associated with the test failure.

17. The apparatus of claim 12, wherein the provided attribute comprises one of:

a maximum number of threads;
a kernel version;
a stack trace associated with the test failure; and
a crash line associated with the test failure.

18. The apparatus of claim 11, wherein associating the test failure with the defect report that remains after the one or more eliminations comprises when a single defect report remains after the one or more eliminations, outputting a link to the defect report.

19. One or more non-transitory computer-readable storage media storing instructions that when executed by a computer cause the computer to perform a method, the method comprising:

receiving and storing a plurality of defect reports associated with a software program, wherein each defect report documents a previously discovered defect in the software program;

testing the software program in a test environment that comprises an operating system executing upon a computer, and a software development platform, wherein the software program has a plurality of attributes each associated with at least one of the operating system, the computer, and the software development platform; and responsive to detecting a given test failure of the software program while testing the software program:

eliminating, based on attributes selected by the defect reports from the plurality of attributes, one or more of the defect reports from the plurality of defect reports, wherein at least one of the selected attributes is retrieved from the test environment during the determination by invoking a provider script that is specified by one of the defect reports, and wherein eliminating one or more of the defect reports from the plurality of defect reports comprises:

automatically gathering one or more of the plurality of attributes from the test environment; and determining, based on at least an automatically gathered attribute selected by a given defect report from the automatically gathered attributes, that a given previously discovered defect, which is documented by the given defect report, did not cause the test failure and eliminating the given defect report from the plurality of defect reports; and associating the test failure with a defect report that remains after the one or more eliminations.

20. The one or more non-transitory computer-readable storage media of claim 19, wherein selecting the defect report further comprises:

determining, based on at least a provided attribute selected by another defect report from the plurality of attributes that were not automatically gathered in response to the test failure, that another previously discovered defect, which is documented by the other defect report, did not cause the test failure and eliminating the other defect report from the plurality of defect reports, wherein the provided attribute is retrieved from the test environment during the determination of the other defect report by invoking a given provider script that is specified by the other defect report.

\* \* \* \* \*